United States Patent [19]

Haeck

[11] Patent Number: 5,894,737
[45] Date of Patent: Apr. 20, 1999

[54] HOUSING WITH INTEGRAL DRAIN FOR REMOVING CONDENSATE FROM A HEATING AND AIR CONDITIONING UNIT

[75] Inventor: Dennis Leon Haeck, Union, Mich.

[73] Assignee: Pro Air, Inc., Elkhart, Ind.

[21] Appl. No.: 08/828,735

[22] Filed: Mar. 20, 1997

[51] Int. Cl.⁶ ................................................. F25D 21/14
[52] U.S. Cl. ................ 62/285; 165/42; 62/272; 62/244; 62/407
[58] Field of Search ........................... 62/272, 285, 288, 62/289, 290, 239, 244, 404, 407, 408; 165/42, 43, 111

[56] References Cited

U.S. PATENT DOCUMENTS 4,083,198  4/1978  Dennis ..................................... 62/285
4,748,827  6/1988  Chang ..................................... 62/272

Primary Examiner—John M. Sollecito
Attorney, Agent, or Firm—Baker & Daniels

[57] ABSTRACT

An improved housing for draining condensed water from the interior of a heating and air conditioning unit installed in a motor vehicle. The contoured bottom wall of the housing includes a raised portion surrounded by a series of sloped channels which lead to a collection basin having a drain. A fan or blower forces air through the housing inlet and past the heating and cooling elements. A portion of one of the sidewalls adjacent the air inlet interrupts the entering air to create a low pressure area. Condensed moisture is drawn along the sloped channels towards a collection basin located in the low pressure area. A drain is provided in the collection basin to remove the moisture from the housing.

9 Claims, 6 Drawing Sheets

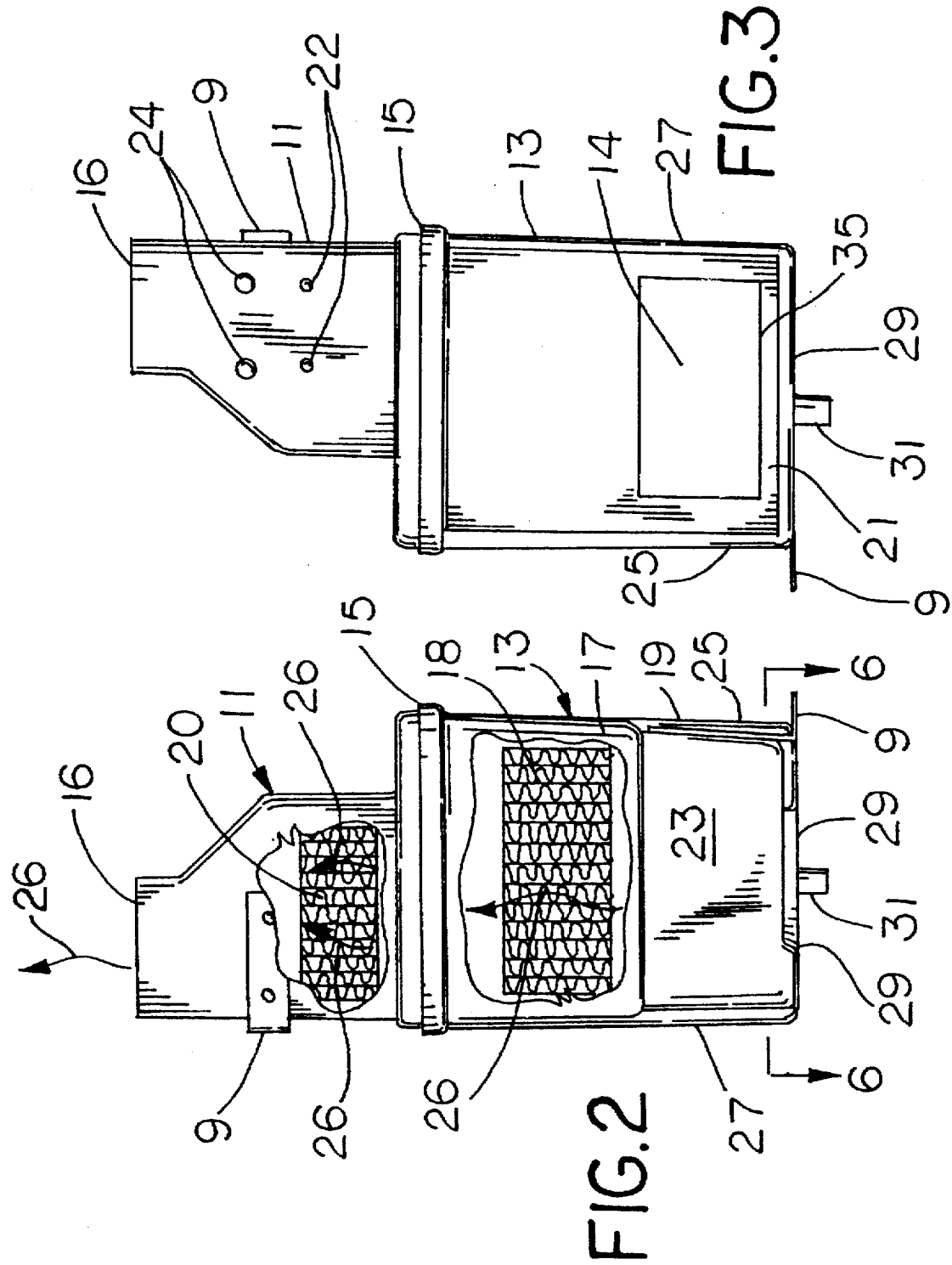

HOUSING WITH INTEGRAL DRAIN FOR REMOVING CONDENSATE FROM A HEATING AND AIR CONDITIONING UNIT This invention relates to an improved housing for auxiliary heating, ventilating and air conditioning (HVAC) units commonly used in motor vehicles such as conversion vans, motor homes, and other recreational vehicles. The improved housing according to the present invention facilitates improved drainage of condensed water from the interior of the HVAC unit.

BACKGROUND AND SUMMARY OF THE INVENTION

Van conversions, motor homes, and other recreational vehicles generally have a large surface area and a large interior volume, and they usually require an auxiliary heating and air conditioning system in the rear of the vehicle in order to maintain a comfortable temperature in winter and summer. These auxiliary systems supplement the primary HVAC system mounted in the forward portion of the vehicle. Because of the large interior volume of these vehicles, the combined primary and auxiliary HVAC systems must have a relatively large cooling capacity.

Warm air holds more moisture than cold air; accordingly, when warm humid air is cooled moisture condenses into water. Unfortunately, large capacity cooling systems generate enough condensed water to quickly fill the housing of most auxiliary HVAC units. Unless the condensed water is removed from the unit, the vehicle windows will fog, and mold will grow in the interior of the vehicle, which has a very undesirable musty smell. Accordingly, the provides a means to route the condensed water out of the housing of an auxiliary HVAC unit.

The improved housing for an auxiliary HVAC unit according to the present invention has an integral drain which permits water to drain from the HVAC unit. The bottom wall of the housing is formed into a collection basin which is located adjacent to the housing air inlet to take advantage of the lower air pressure produced by the high air velocity at the inlet due to the fan. The bottom wall also includes a series of sloped drainage channels near the edges of the bottom wall which drain water towards the collection basin. A raised area in the bottom wall urges the water towards the drainage channels. Once in the drainage channels, the water drains into the collection basin, which is provided with a drain opening which routes the condensed water out of the unit.

Accordingly, it is an object of this invention to provide an auxiliary heating and air conditioning unit with an improved housing having an integral collection basin in the bottom wall thereof and a drain opening which drains water from the collection basin.

Another object of this invention is to provide an improved housing which pulls condensed water into a collection basin by using the low pressure area created by the fan adjacent to the air inlet.

These and other objects of the invention will become readily apparent to those skilled in the art upon a reading of the following description.

BRIEF DESCRIPTION OF THE DRAWINGS

FIG. 2 is a left end elevational view of the housing shown in FIG. 1;

FIG. 3 is a right end elevational view of the housing shown in FIGS. 1 and 2, showing the fan removed to reveal the air inlet;

DETAILED DESCRIPTION OF THE INVENTION

Figure 1:
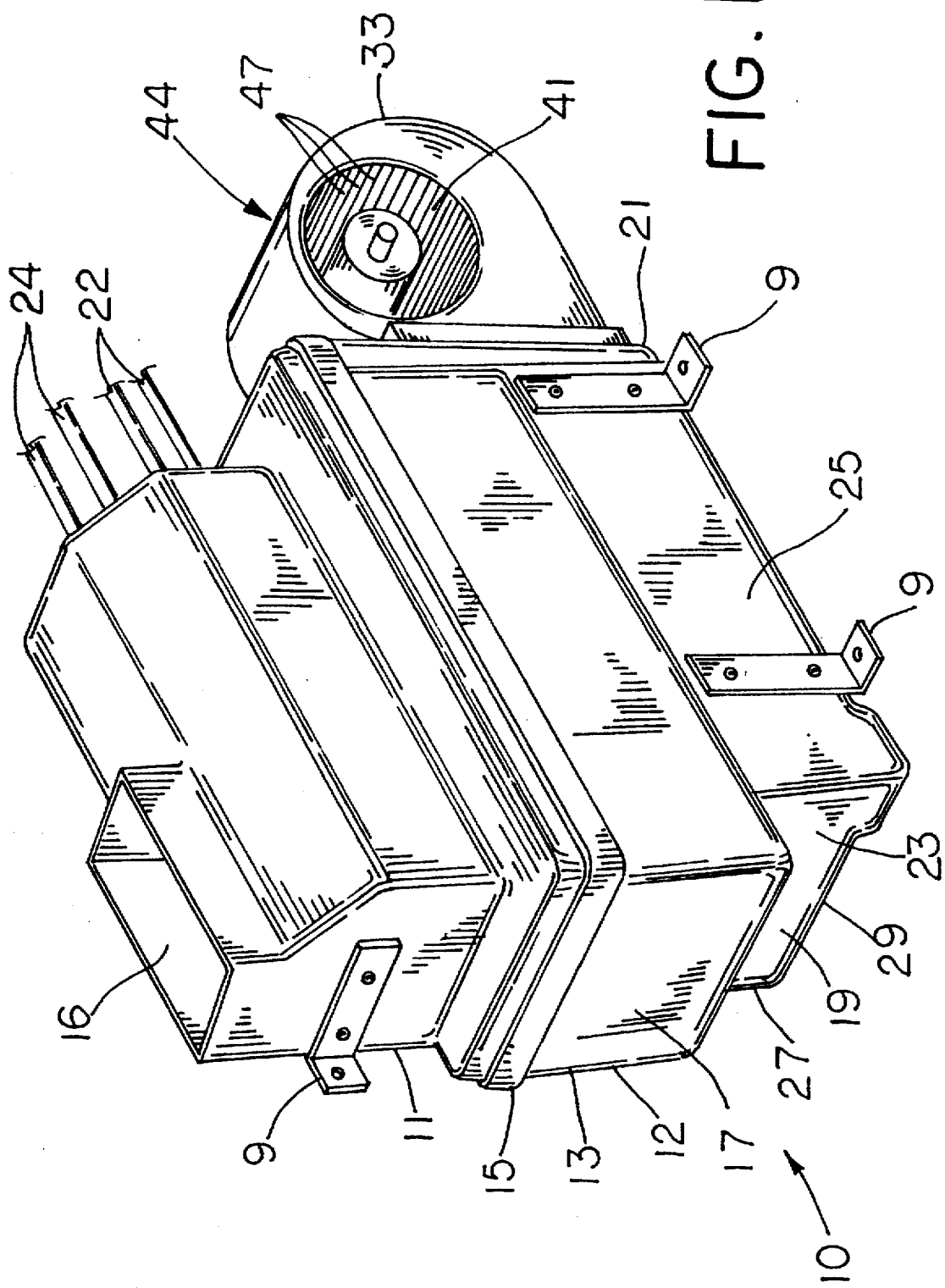
FIG. 1 is a perspective view of the housing for an auxiliary heating-air conditioning unit according to the present invention.
Figure 4:
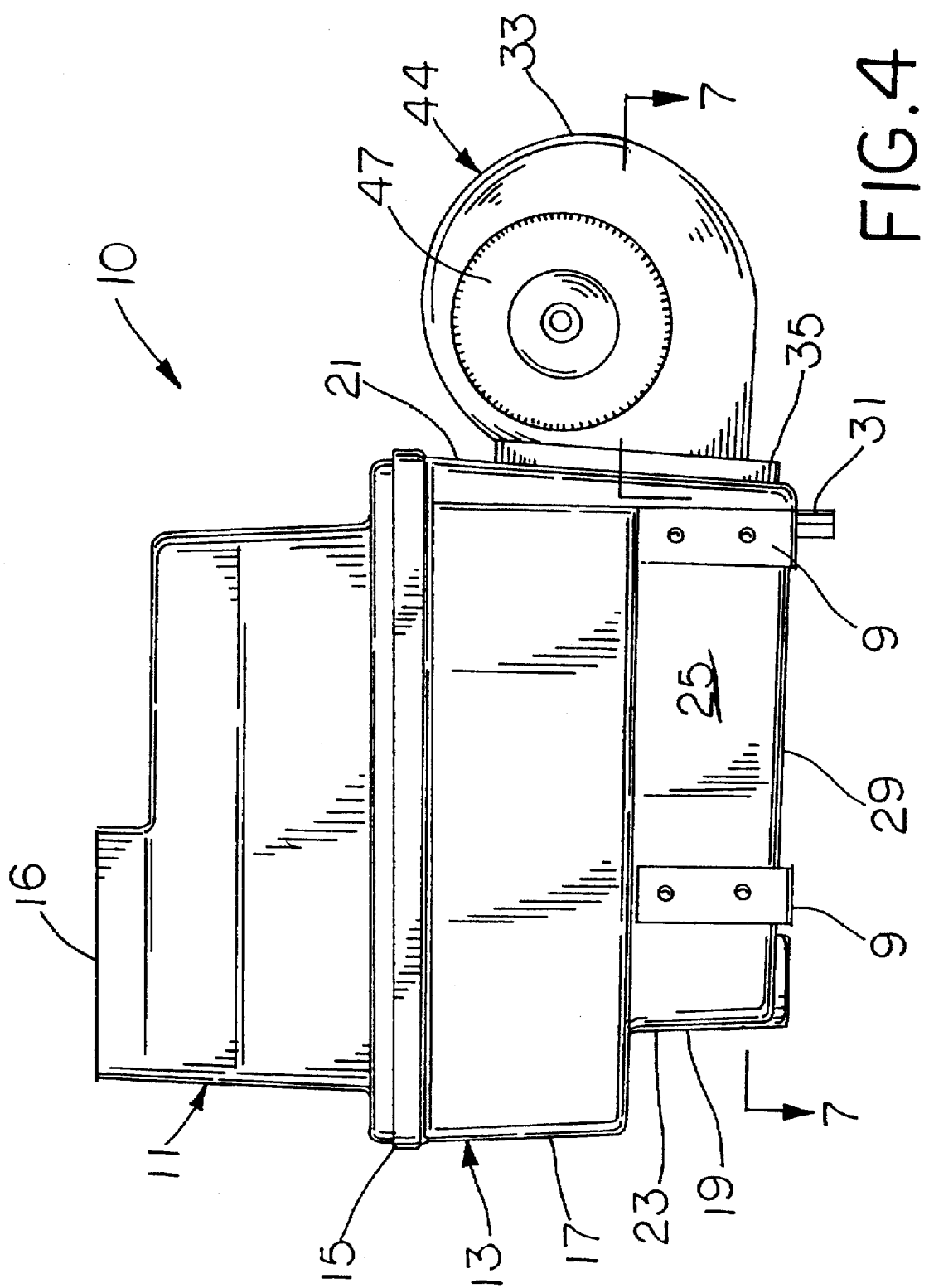
FIG. 4 is a front elevational view of the housing of FIGS. 1 through 3 showing the bottom wall sloping towards the drain which is located adjacent the air inlet.

Referring now to the drawings, FIGS. 1 through 3 show an auxiliary heating-air conditioning unit generally indicated by the reference numeral 10 for mounting in the interior of a van conversion, motorhome, or other recreational vehicle (not shown). A plurality of mounting brackets 9 are provided to secure the unit 10 to the floor and/or walls (not shown of the vehicle). The unit 10 includes a housing 12 having an air inlet 14 and an air outlet 16. Mounted within housing 12 is an air conditioning evaporator unit or cooling element 18, and a heating element 20. Preferably, the heating element 20 is situated above the cooling element 18 so that the overall floor space required by the unit 10 is minimized in order to conserve space within the interior of the motor vehicle. Also, although the cooling element 18 and the heating element 20 are shown as separate elements in FIG. 2, it is known in the art to combine the heating and cooling functions into one integrated element.

Cooling element 18 is connected to refrigerant supply lines 22 and to a thermal expansion valve (not shown) as is known in the industry. Heating element 20 is connected to hot water supply lines 24. Refrigerant supply lines 22 and hot water supply lines 24 are connected to the air conditioning compressor unit (not shown) and the radiator system (not shown), respectively, of the motor vehicle. A control system (not shown) causes coolant to flow through the refrigerant supply lines 22 and hot water to flow through the hot water supply lines 24, so that cooling element 18 can be activated to cool the vehicle, heating element 20 can be activated to heat the vehicle, or both elements can be activated simultaneously in order to cool, dry, and then reheat the air flowing through the unit in order to defog the windows.

Figure 6:
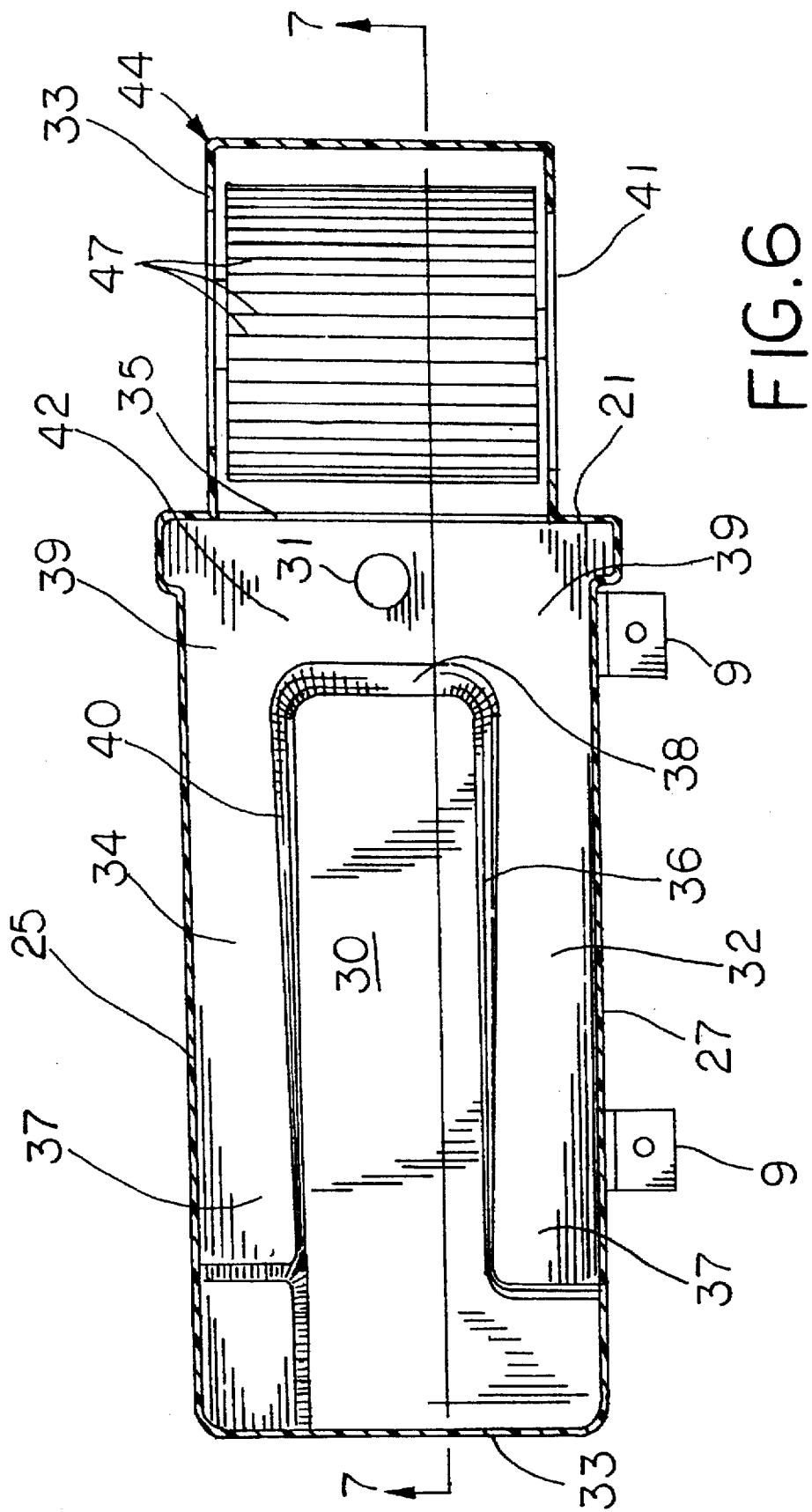
FIG. 6 is a cross-sectional view taken substantially along lines 6—6 of FIG. 2 showing the contours of the drainage channels in the sloped bottom wall.
Figure 7:
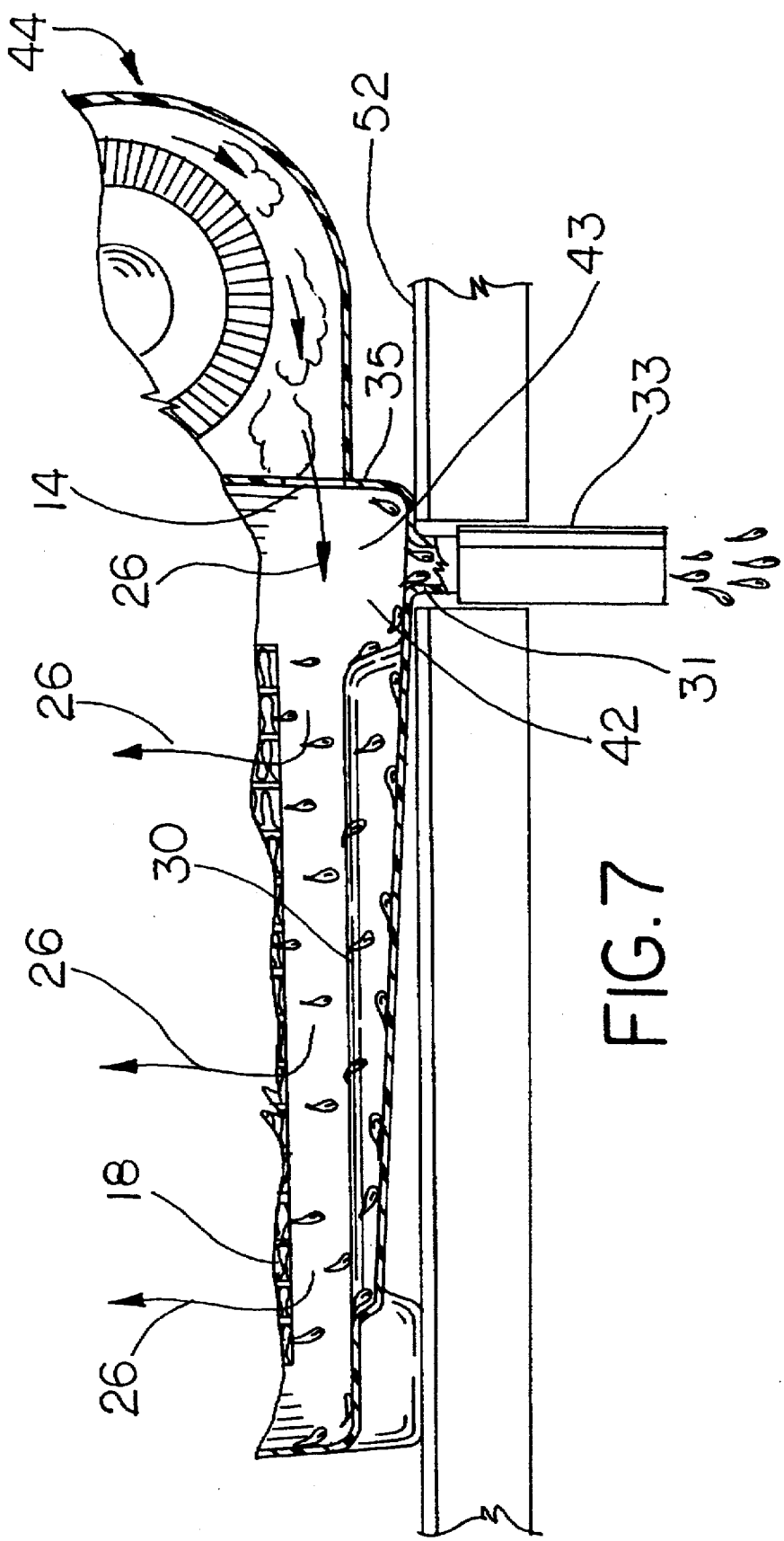
FIG. 7 is a fragmentary cross-sectional view taken substantially along lines 7—7 of FIG. 6 showing condensed moisture flowing along the drainage channels in the bottom wall towards the collection basin area adjacent the air inlet from where the moisture is routed out of the housing through the drain.

Housing 12 is shaped so as to define an air flow path through housing 12 as indicated by arrows 26 as shown in FIGS. 2 and 7. As shown in FIGS. 1 through 7, housing 12 includes a top section 11 and a bottom section 13 which are secured to each other along seam 15. Top section 11 and bottom section 13 each are preferably injection molded as is common in the industry. Housing 12 is separable along seam 15 to permit the installation, removal, or servicing of cooling element 18 and/or heating element 20. Bottom section 13 includes an upper section 17 sized to receive cooling element 18, and also includes a lower section 19. Lower section 19 is defined in part by sidewalls 21, 23, 25 and 27, which are connected by an interconnecting bottom wall 29. Bottom wall 29 includes a drain 31, which connects to a drain tube 33 for routing condensed water through the floor 52 of the vehicle as shown in FIG. 7.

Figure 5:
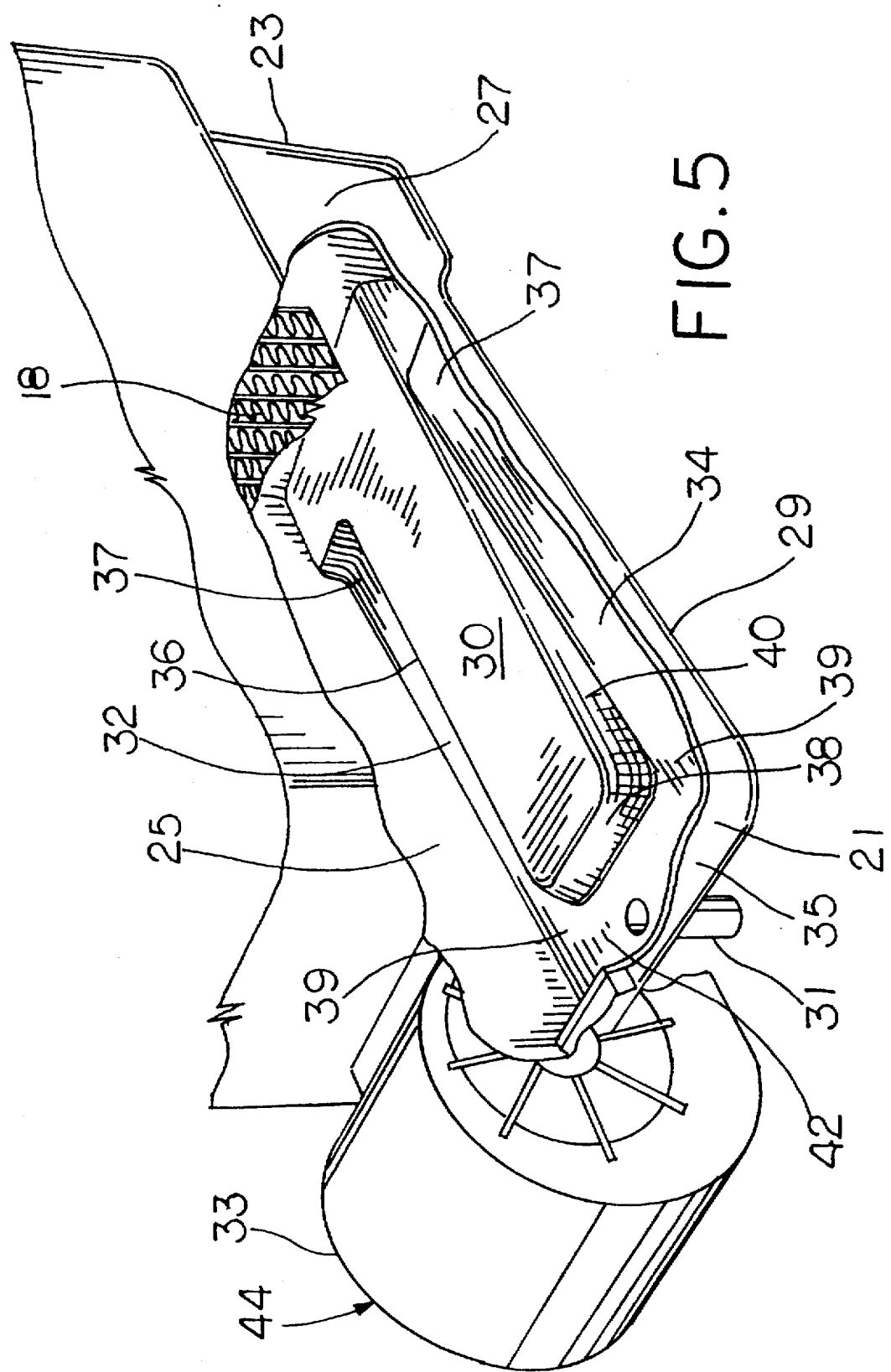
FIG. 5 is a fragmentary view in perspective of the housing according to the present invention shown with a portion of the housing cut away to reveal the contours of the sloped bottom wall.

As shown in FIGS. 5 through 7, bottom wall 29 includes a raised portion 30 flanked surrounded by a pair of channels 32, 34. Channels 32, 34 each include a raised end 37 disposed generally adjacent sidewall 23, and also include a lowered end 39 disposed generally adjacent sidewall 21, so that channels 32, 34 slope downwardly from sidewall 23 towards sidewall 21. Raised portion 30 includes a plurality of edges 36, 38, 40, which generally slope downwardly from raised portion 30 to the adjacent channels 32, 34. The lowered ends 38 of channels 32, 34 terminate in a collection basin 42 adjacent sidewall 21. Drain hole 31 is located centrally within collection basin 42.

A fan 44 is mounted to sidewall 21 adjacent air inlet 14. Sidewall 21 includes a lower edge 35 which defines the lower edge of air inlet 14. The fan 34 is preferably of the rotary centrifugal fan design, having a plurality of fan blades 37 positioned around a rotating central hub as is common in the industry, and preferably uses a one speed permanent magnet motor in order to provide longer life and quieter operation than conventional wire wound motors. Fan 44 includes a housing 33 enclosing the motor and the fan blades 47, and housing 33 includes an air inlet 41 which allows air to enter the fan housing 33. Fan 44 forces air through inlet 14 and through the housing 12 along flow path 26. The air moving through the unit 10 proceeds along flow path 26, through the cooling element 18, through the heating element 20, and out the outlet 16 where it enters distribution ducts (not shown) for distribution through the interior of the vehicle. The air is cooled or heated depending on which unit has been activated by the vehicle operator.

In operation, when the fan 44 is operating the air enters the housing through inlet 14. The high velocity of the air passing over lower edge 35 of sidewall 21 creates a turbulent low pressure area 43 immediately over the collection basin 42. As shown in FIG. 7, whenever the cooling element 18 has been activated, the cooling process causes moisture in the air to condense into a plurality of water droplets 50. The water droplets 50 drip off of the cooling element 18 onto the bottom wall 29 of bottom section 13. The sloped edges 36, 38 and 40 of raised portion 30 allows the droplets 50 to flow off of the raised portion 30 and into channels 32, 34. The droplets collect in the channels 32, 34, and the water droplets flow from the raised end 37 towards the lowered end 39 of each of the channels 32, 34 assisted by gravity as well as the low pressure area over collection basin 42. Thus, the droplets 50 collect in the collection basin 42, and flow through drain 31. Drain 31 includes an extension 33, which routes the droplets out of the vehicle, preferably through a hole in the vehicle floor 52 as shown in FIG. 7.

It is understood that the above description does not limit the invention to the above-given details, but may be modified within the scope of the following claims.

What is claimed:

1. A device for draining condensed water from the interior of a heating and air conditioning unit of a motor vehicle, comprising:

a housing having a top wall and a bottom wall and a plurality of interconnecting sidewalls, said housing including an air inlet defined by one of said sidewalls and further including an air outlet, said housing defining an air flow path between said inlet and said outlet, said housing adapted to accommodate a heating element and a cooling element located in said flow path, said one sidewall and said bottom wall cooperating to define a collection basin;

a fan means mounted to said one sidewall for forcing air through and over said collection basin to define a region of low air pressure air flowing over said collection basin, said collection basin including a drain hole; and said bottom wall includes a raised portion and, channeling means flanking said raised portion and integral with said bottom wall for channeling condensed water towards said collection basin so that the condensed water can exit said housing through said drain hole.

2. The device as claimed in claim 1, said air inlet including a lower edge defining a portion of said collection basin, said lower edge cooperating with the fan to create said low pressure area as the fan forces air through said inlet and into said housing.

3. The device as claimed in claim 1, wherein said channeling means includes a raised portion in said bottom wall, and said bottom wall includes a sloped area sloping from said raised portion towards said collection basin.

4. The device as claimed in claim 3, wherein said raised portion extends from an other of said sidewalls to said collection basin.

5. The device as claimed in claim 4, wherein said raised portion includes a plurality of sloped edges, said sloped edges being in flow communication with said channeling means.

6. The device as claimed in claim 5, wherein said channeling means surrounds said sloped edges of said raised portion.

7. The device as claimed in claim 3, wherein said channeling means includes a pair of channels, said channels surrounding a portion of said raised portion of said bottom wall, said channels defining said sloped area of said bottom wall.

8. The device as claimed in claim 1, wherein said drain includes an elongated tubular extension for communicating water out of said housing and out of the vehicle.

9. A device for draining condensed water from the interior of a heating and air conditioning unit of a motor vehicle, comprising:

a housing having an air inlet and an air outlet, said housing defining an air flow path between said inlet and said outlet;

said housing including a top wall and a bottom wall and a plurality of interconnecting sidewalls, a heating element and a cooling element within said flow path;

a fan mounted to one of said sidewalls adjacent said air inlet for forcing air through said housing along said flow path, said one sidewall and said bottom wall cooperating to define a collection basin, said collection basin including a drain hole; and said bottom wall includes a raised portion and channeling means flanking said raised portion and integral with said bottom wall for channeling condensed water towards said collection basin, said channeling means including means responsive to said fan for interrupting a portion of said flow path to thereby create a region of low pressure air flowing over said collection basin, so that said low pressure region draws condensed water through said channeling means towards said low pressure region and into said collection basin and said drain hole.

* * * * *